US006301250B1

(12) United States Patent
Schmitz

(10) Patent No.: US 6,301,250 B1
(45) Date of Patent: *Oct. 9, 2001

(54) METHOD OF OPERATING AN INTERFACE DEVICE AS WELL AS INTERFACE DEVICE AND EXCHANGE WITH SUCH AN INTERFACE DEVICE

(75) Inventor: Bernhard Schmitz, Renningen-Malmsheim (DE)

(73) Assignee: Alcatel, Paris (FR)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/903,954

(22) Filed: Jul. 31, 1997

(30) Foreign Application Priority Data

Jul. 31, 1996 (DE) ............................................. 196 30 845

(51) Int. Cl.⁷ .................................. H04L 12/56; H04J 3/16
(52) U.S. Cl. ............................................ 370/395; 370/467
(58) Field of Search .................................... 370/395, 397, 370/419, 420, 465, 466, 467, 522, 524, 410

(56) References Cited

U.S. PATENT DOCUMENTS

| 5,274,635 | * | 12/1993 | Rahman et al. | 370/352 |
|---|---|---|---|---|
| 5,375,118 | * | 12/1994 | Rao et al. | 370/401 |
| 5,521,924 | * | 5/1996 | Kakuma et al. | 370/466 |
| 5,703,880 | * | 12/1997 | Miura | 370/465 |
| 5,764,637 | * | 6/1998 | Nishihara | 370/397 |
| 5,784,371 | * | 7/1998 | Iwai | 370/397 |
| 5,991,301 | * | 11/1999 | Christie | 370/395 |
| 6,002,689 | * | 12/1999 | Christie et al. | 370/401 |

FOREIGN PATENT DOCUMENTS

| 1946694 | 3/1971 | (DE) . |
| 3138700 | 9/1990 | (DE) . |
| 4224388 | 7/1993 | (DE) . |

OTHER PUBLICATIONS

ITU–T Recommendation I.580, "General arrangements for interworking between B–ISDN and 64 kbit/s based ISDN", Study Group 13, Geneva Meeting, Nov. 14–25, 1994), pp. 1–38.

"ISDN und ATM—ein neuer Weg in die Telecommunikation des 21. Jahrhunderts", P. Gerke, *Fernmelde Praxis,* 21/89, vol. 66, Nov. 10, 1989, pp. 873–892.

"Asynchronous Transfer Mode of Synchronous Transfer Mode or Both?", M. Aaron et al, *IEEE Communications Magazine,* Jan. 1991, vol. 1, pp. 10–13.

* cited by examiner

*Primary Examiner*—Chau Nguyen
*Assistant Examiner*—Soon-Dong Hyun

(57) ABSTRACT

The invention relates to a method of operating an interface device (IWF) for connecting a first telecommunication subnetwork (ISDN) operated in synchronous time-division multiplex mode (ISDN) with a fixed assignment of time slots to transmission channels using a first signaling protocol (SI1), to a second telecommunication subnetwork (ATM) operated in a statistical multiplex mode (ATM) with a transmission capacity assigned to each connection by free agreement using a second signaling protocol (SA1), the interface device performing a conversion between the first signaling protocol and the second signaling protocol, wherein during each connection setup the signaling is converted in such a way that the number of transmission channels (Ch1, . . . Ch6; Ch20, . . . , Ch30) reserved in the first subnetwork (ISDN) for the connection to be set up and the transmission capacity assigned to said connection in the second subnetwork (ATM) are adapted to one another, as well as an interface device and an exchange with such an interface device.

5 Claims, 4 Drawing Sheets

METHOD OF OPERATING AN INTERFACE DEVICE AS WELL AS INTERFACE DEVICE AND EXCHANGE WITH SUCH AN INTERFACE DEVICE

BACKGROUND OF THE INVENTION

1. Technical Field of the Invention

The invention relates to a method for operating an interface device, an interface device, and an exchange with such an interface device.

2. Discussion of Related Art

A large segment of the today's worldwide telecommunication network is operated in synchronous time division multiplex mode. Long distance calls which represent the major portion of the traffic in this network, are transmitted in communication channels at 64 kbit/s. These channels are combined in different hierarchical orders into channel bundles with a plurality of channels. In Europe and elsewhere, the next hierarchical order is located at two Mbit/s (exactly at 2.048 Mbit/s). This so-called primary multiplex mode (E1) contains 30 voice channels, one synchronization channel, and one signaling channel, each with 64 kbit/s. In this synchronous time division multiplex mode, there exists a defined temporal correspondence between time slots and transmission channels. A similar hierarchical level called DS1 (Digital Signal-Level 1) is used in the USA and elsewhere at 1.544 Mbit/sec with 24 voice channels.

Since some time, these telecommunication networks are also utilized for other purposes besides voice transmission. For many of today's applications (an important application of this type is telefax), such a voice channel with 64 kbit/s is utilized as a data channel. It is unimportant for the present invention if these data are supplied to the network directly in digital form or by way of an analog connection via modem.

The transmission capacity of 64 kbit/s which is adapted to voice transmission, forms inevitably also the basis for data transmission. Data transmission can, to a certain extent, be adapted to available transmission channels. There exist, however, certain limitations. For this reason, there have been established, on one hand, specialized data networks which are somehow connected to the remaining communication network and consequently are subnetworks thereof. On the other hand, several individual channels can be occupied at the same time and used as a transmission channel with higher capacity.

The transmission channels which are used here primarily, correspond to the higher multiplex levels, for example, two Mbit/s. But also other bundles, such as n×64 kbit/s and n×2 Mbit/s or n×1.5 Mbit/s, can be advantageously applied.

A completely different approach for transmitting data is provided by the statistical time division multiplex technique. This technique was originally developed as a packet switching technique specifically for transmitting data. When data are to be transmitted, these data are always combined in a packet and sent to the recipient preceded by an address segment. This can be accomplished in asynchronous time-division multiplex mode but also in other multiplex modes capable of subdividing the available capacity. Today's ATM technology (ATM=asynchronous transfer mode) was developed on this foundation.

Each connection is preceded by a connection setup phase wherein, besides other tasks, a route is established from the calling party to the called party. This facilitates addressing and enables relative and thereby shorter addresses. A prerequisite, however, is the availability of the necessary transmission capacity. For this purpose, a certain transmission capacity must be associated with each connection by agreement. In modern ATM technology, this is accomplished, for example, by specifying an average data rate, a maximum data rate, and a traffic type such as "constant data rate" or "variable data riate".

Initially, it is unimportant how this assignment is made. One possibility are one-time agreements which are then valid for all connections of the subscriber; the transmission capacity between the subscriber device and the exchange is automatically allocated, preferably during each connection setup; however, adaptive changes can be made during the connection and are not excluded. Today, agreements are preferred wherein the deviations from a time averaged value are as small as possible. Agreements with statistical variations are generally not excluded. The available reserved transmission capacity can be utilized economically through buffering or adaptive changes to the agreement. All agreements, including any changes, however, have to be routed onward by way of signaling to all affected locations along the transmission path.

The worldwide telecommunication network discussed above will, however, be always subdivided into subsets employing different technologies and different standards. These subnetworks cooperate via interface devices. The signaling between the two subnetworks with their different signaling protocols is also converted.

The version of the ITU-T recommendation I.580, COM 13-R 30-E, which was ratified in December 1994, was published by the ITU (International Telecommunications Union) on Feb. 9, 1995. The recommendation relates to "General arrangements for interworking between B-ISDN and 64 kbit/s based ISDN".

B-ISDN herein refers to the statistical multiplex technique referenced above as ATM. ISDN refers to the synchronous time division multiplex technique. The recommendation cited above describes an "Interworking Function" between ATM and ISDN with n×64 kbit/s. The case n>1 is mentioned therein, but is not described in greater detail.

With this technique, it is possible to connect each transmission channel on the ISDN side with a virtual channel on the ATM side. It is also known, for example, that a complete primary multiplex mode including 30 information channels, one synchronization channel, and one signaling channel can all together be connected with one virtual channel on the ATM side.

SUMMARY OF INVENTION

It is therefore the object of the invention to provide solutions for the aforementioned interface devices so that in each case only the respective required capacity is occupied in both subnetworks.

According to a first aspect of the invention, a method comprising the steps of operating an interface device for connecting with a plurality of connections a first telecommunications subnetwork, operating in a synchronous time-division multiplex mode with a fixed assignment of time slots to transmission channels using a first signaling protocol, to a second telecommunications subnetwork, operating in a statistical multiplex mode with a transmission capacity assigned to each connection by free agreement using a second signaling protocol, the interface device performing a conversion between the first signaling protocol and the second signaling protocol, wherein during each connection setup, converting the signaling by adapting a number of transmission channels reserved in the first subnetwork for the connection undergoing set up to a transmission capacity assigned to said connection in the second subnetwork.

According to a second aspect of the invention, an interface device comprising means for connecting a first telecommunications subnetwork, operated in a synchronous time-division multiplex mode with a fixed assignment of time slots to transmission channels using a first signaling protocol, to a second telecommunications subnetwork, operated in a statistical multiplex mode with a transmission capacity assigned to each connection by free agreement using a second signaling protocol, the interface device further comprising means for performing a conversion between the first signaling protocol and the second signaling protocol, wherein during each connection setup, the signaling is converted in such a way that the number of transmission channels reserved in the first subnetwork for the connection to be set up and the transmission capacity assigned to said connection in the second subnetwork are adapted to one another.

According to a third aspect of the invention, an exchange including an interface device for connecting a first telecommunications subnetwork, operated in a synchronous time-division multiplex mode with a fixed assignment of time slots to transmission channels using a first signaling protocol, to a second telecommunications subnetwork, operated in a statistical multiplex mode with a transmission capacity assigned to each connection by free agreement using a second signaling protocol, the interface device including means for performing a conversion between the first signaling protocol and the second signaling protocol, wherein during each connection setup, the signaling is converted in such a way that the number of transmission channels reserved in the first subnetwork for the connection to be set up and the transmission capacity assigned to said connection in the second subnetwork are adapted to one another.

The interface device at the transition between two subnetworks appears to each of the two networks as a terminal device which establishes the required capacity for the outgoing or the incoming traffic. This is not restricted to establishing connections based on 64 kbit/s to ATM. Bundles with a higher degree of multiplexing, for example with n×2 Mbit/s, and even bundles of the form n×64 kbit/s +m ×2 Mbit/s can cooperate with the ATM side. In conformity with the most common multiplex technique today, the ATM side will subsequently also be called asynchronous side, as opposed to the ISDN side which will be called synchronous side.

Preferably, the interface device is integrated into one of the two neighboring exchanges.

Other embodiments of the invention are described in the following description.

BRIEF DESCRIPTION OF THE DRAWINGS

In the following, the invention is explained in greater detail with reference to the accompanying drawings.

DETAILED DESCRIPTION OF PREFERRED EMBODIMENTS

Figure 1:
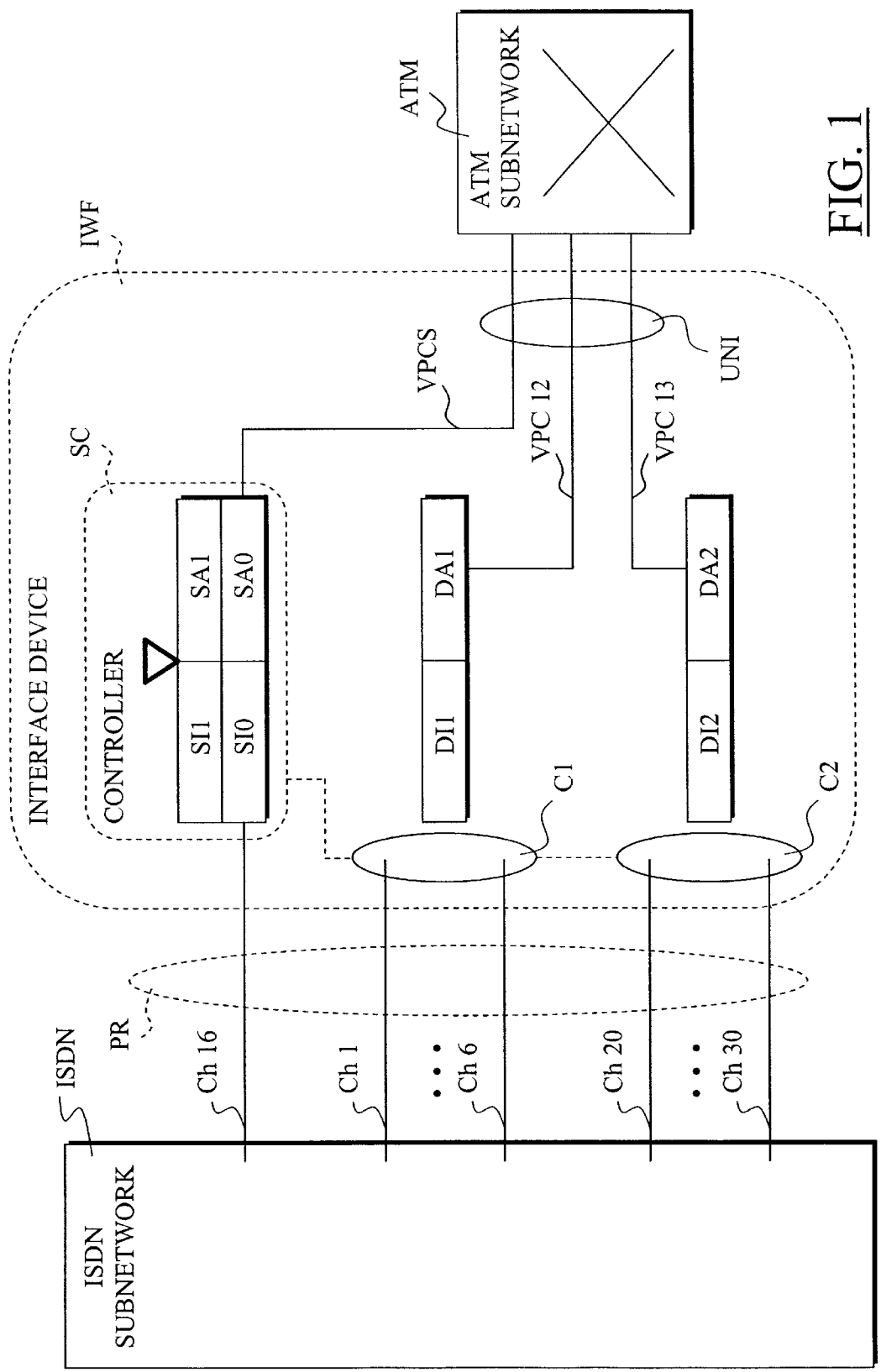
FIG. 1 shows the transition between an ISDN subnetwork and an ATM subnetwork through an interface device according to the invention.

Referring now to FIG. 1, there is described a device at a transition between an ISDN subnetwork and an ATM subnetwork. The ISDN subnetwork is represented by an ISDN private branch exchange ISDN and a primary multiplex access PR. The ATM subnetwork is represented by an ATM exchange ATM and an ATM interface UNI (UNI=User Network Interface). The transition takes place in an interface device IWF where the required transition functions are executed (IWF=Interworking Function).

In the present example, the primary multiplex access PR carries three connections, namely the signaling channel Ch16, and two information links C1 and C2. The information link C1 comprises here six basic channels with 64 kbit/s each, Ch1, . . . , Ch6, the information link C2 comprises eleven basic channels, Ch20, . . . , Ch30. It is not essential that the basic channels which are combined here into an information link, are sequential channels in primary multiplex mode; it only aids in visually simplifying the illustrations. Since it is customary and helpful for illustrative purposes, it will be assumed that both transmission devices have identical capacities. However, this is not an essential requirement.

In the present example, there are also three connections active in the ATM interface device UNI, namely a signaling channel VPCS and two information channels VPC 12 and VPC 13. Each of these channels VPCS, VPC 12 and VPC 13 is defined by a virtual path and a virtual channel; the signaling channel is referenced here, for example, as VP0/VC5. In contrast to the channels on the ISDN side, the capacity of a channel on the ATM side is not initially specified, but is specified at a later time when the connection is set up, in the manner described above. An information channel on the ATM side then accepts the capacity of the respective connection on the ISDN side.

The interface device IWF is provided with a controller SC as well as with devices DI1, DA1, DI2, and DA2 required for converting the data streams.

The interface device IWF operates on both sides like a multifunction terminal. On the ISDN side, there is associated with each connection which corresponds to an application in this fictitious multifunction terminal, a data source and a data sink, in this case DI1 and DI2. Accordingly, all connections on the ATM side are terminated by data sources and data sinks, in this case DA1 and DA2. As a result, each data source element of one side is simultaneously a data sink element of the other side; data arriving in DI1 as ISDN data are transmitted by DA1 as ATM data, without changing their contents. The data format is, of course, completely different, for example, on the ISDN side conforming to the ITU-T recommendation G.704 and on the ATM side in the AAL1 data format (AAL=ATM Adaptation Layer) conforming to the ITU-T recommendation I.363.

For each of the two directions, there exists a memory which is common to all data sources and data sinks. The data are then written by one side according to a pattern corresponding to the data format of the respective one side and are read on the other side according to a pattern which corresponds to the data format of the respective other side. This is basically a rather normal connection process, aside from the fact that the two opposing sides are not two identical ISDN sides or two identical ATM sides. This concept can, in principle, be extended to the transition between several input and output lines on both sides.

The pattern used by one side to write or to read, is established during the setup of a connection. This takes place via the signaling channels Ch16 and VPCS. The signaling channel Ch16 of the ISDN side terminates in a network interface SI0 operating, for example, according to the ITU-T recommendation X.75. The signaling data are made accessible in a protocol device SI1 operating, for example, according to the ITU-T recommendation Q.931. The signaling channel VPCS of the ATM side terminates in an interface SA0 operating, for example, according to the S.AAL protocol conforming to the ITU-T recommendations Q.2130 and Q.2110. The signaling data signaled by this side are also made accessible in an associated protocol unit SA1 operating, for example, according to the ITU-T recommendation Q.2931. The data which are thus accessible from both sides, are now, on one hand, transmitted to the protocol unit of the respective other side, and, on the other hand, processed internally. In this way, the patterns which will be used by both sides for accessing the common memory can be established during the connection setup in the manner described above, with the memory representing the data sources and data sinks in the devices DI1, DI2, DA1, and DA2.

When the signaling information is converted, it has to be taken into account that the only possible transmission capacities on the synchronous side, in the present example the ISDN side, must be a multiple of the transmission capacity of each individual transmission channel, in the case of ISDN a B channel. On the other hand, it has to be taken into account that, in principle, an arbitrary transmission capacity is possible on the asynchronous side, here the ATM side; however, substantial delays can occur when the transmission capacity is too small. Moreover, the transmission capacities in both subnetworks, i.e., on both sides, have to be adapted to each other.

In the simplest case, signaling during connection setup is influenced in such a way that on the ATM side only such transmission capacities are agreed to, which are multiples of the transmission capacity of a basic channel in the ISDN network.

The patterns used to access the common memory are in the simplest case selected in such a way that the useful information is converted in such a way that an intermediate level based on this pattern is at least fictitiously introduced, wherein the respective data stream to be transmitted is present in its original form, i.e. in a structure not modified for transmission.

In the interface device, there can be performed an additional standards conversion, for example, between BCD (binary coded decimal) and ADPCM (adaptive differential pulse code modulation). This can be accompanied by data compression. Each standards conversion performed in this manner has to be taken into account when converting the signaling.

Figure 3:
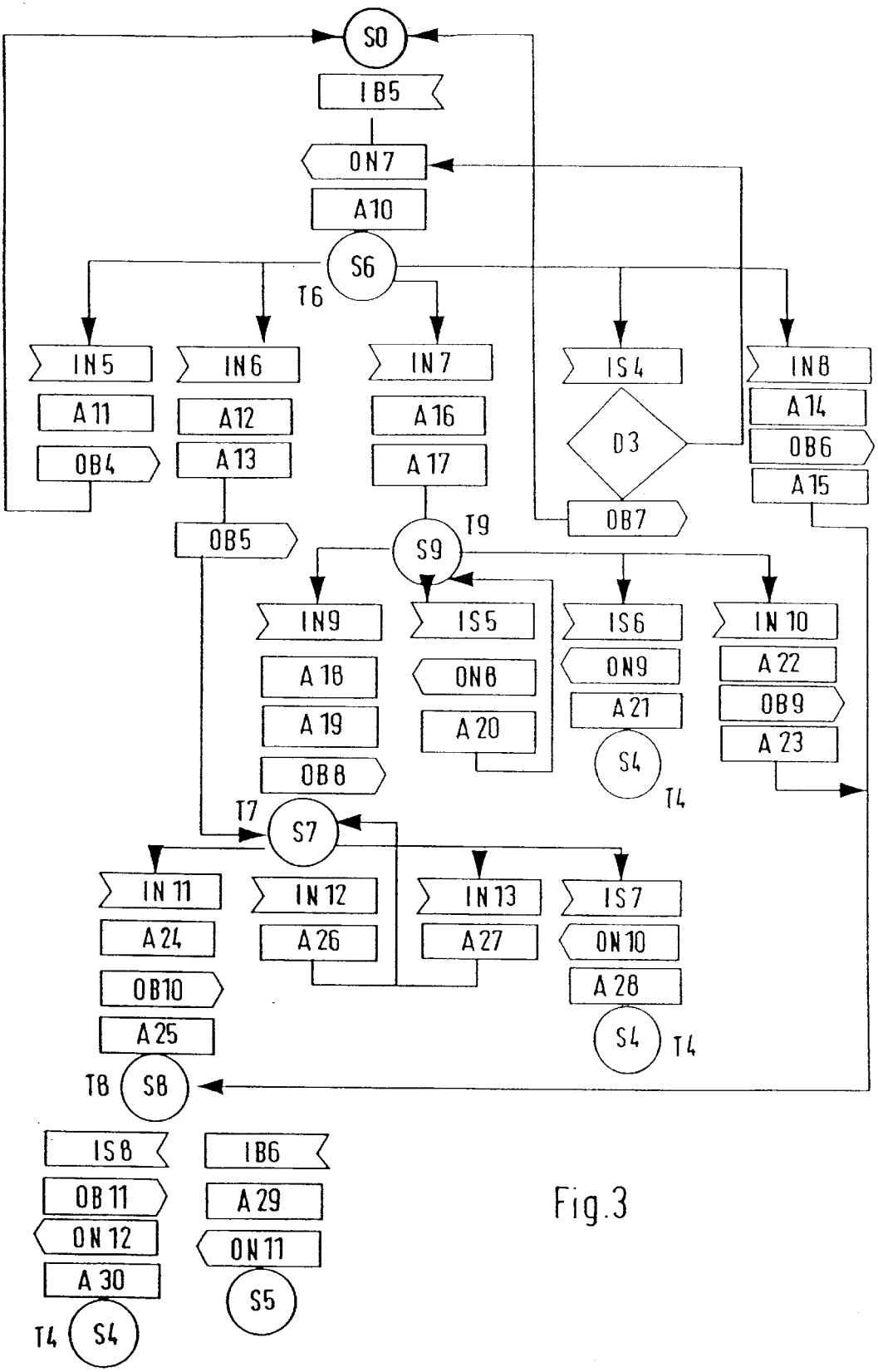
FIG. 3 shows a flow diagram according to FIG. 2, wherein the connection setup is initiated from the ATM side.
Figure 4:
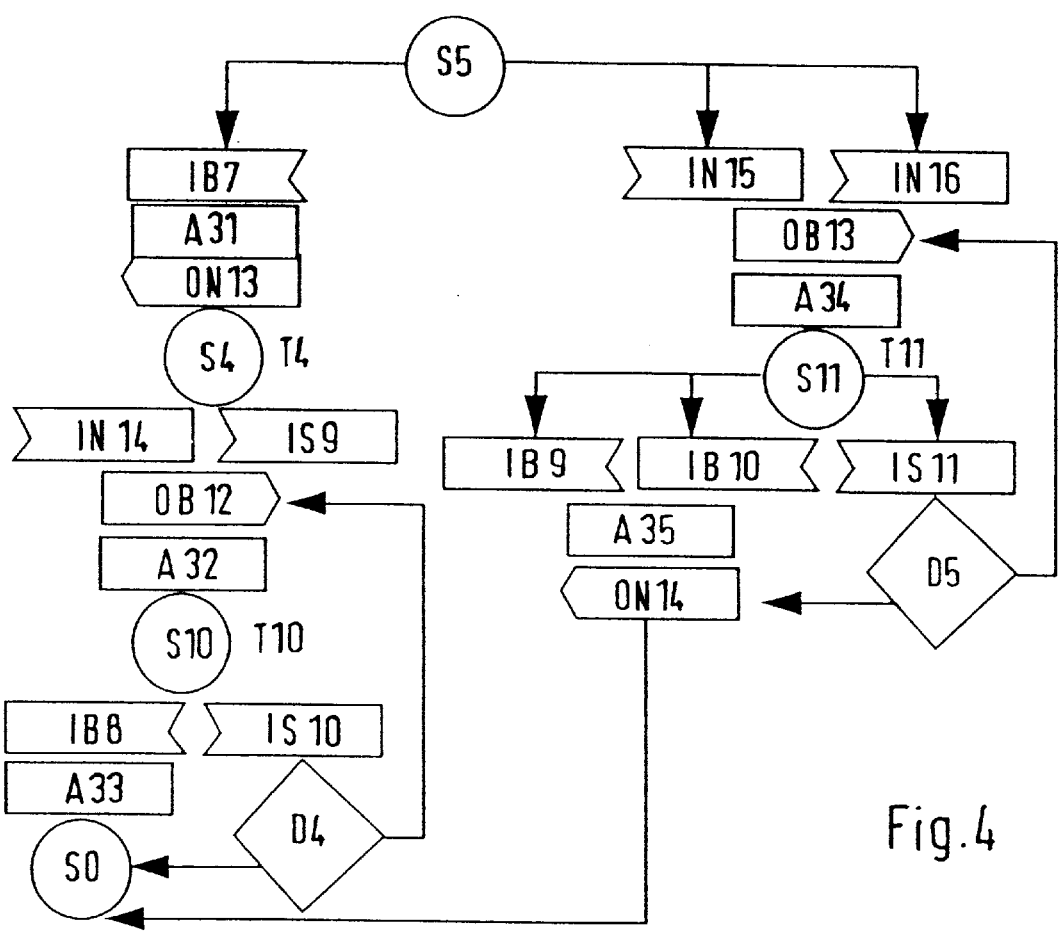
FIG. 4 shows a flow diagram for disconnecting a connection.

The sequence of operations will now be described briefly with reference to FIGS. 2 to 4. First, the terminology in the Figures will be explained. States will be designated with the letter S (state), and a sequential number. Decisions will be designated with the letter D (decision) and a sequential number. Inputs and outputs are initially designated with the letter I (input) and O (output), respectively, followed by a letter indicating from which side or to which side the input or output occurs, followed by a sequential number. The ISDN side is here regarded as the narrowband side and has the letter N (narrowband); the ATM side is regarded as the broadband side and is designated with the letter B (broadband). Internally generated and internally processed input messages receive the letter S (system) following the letter I. With most of the states there is associated a timing circuit which is designated with the letter T followed by the sequential number of the associated state.

Figure 2:
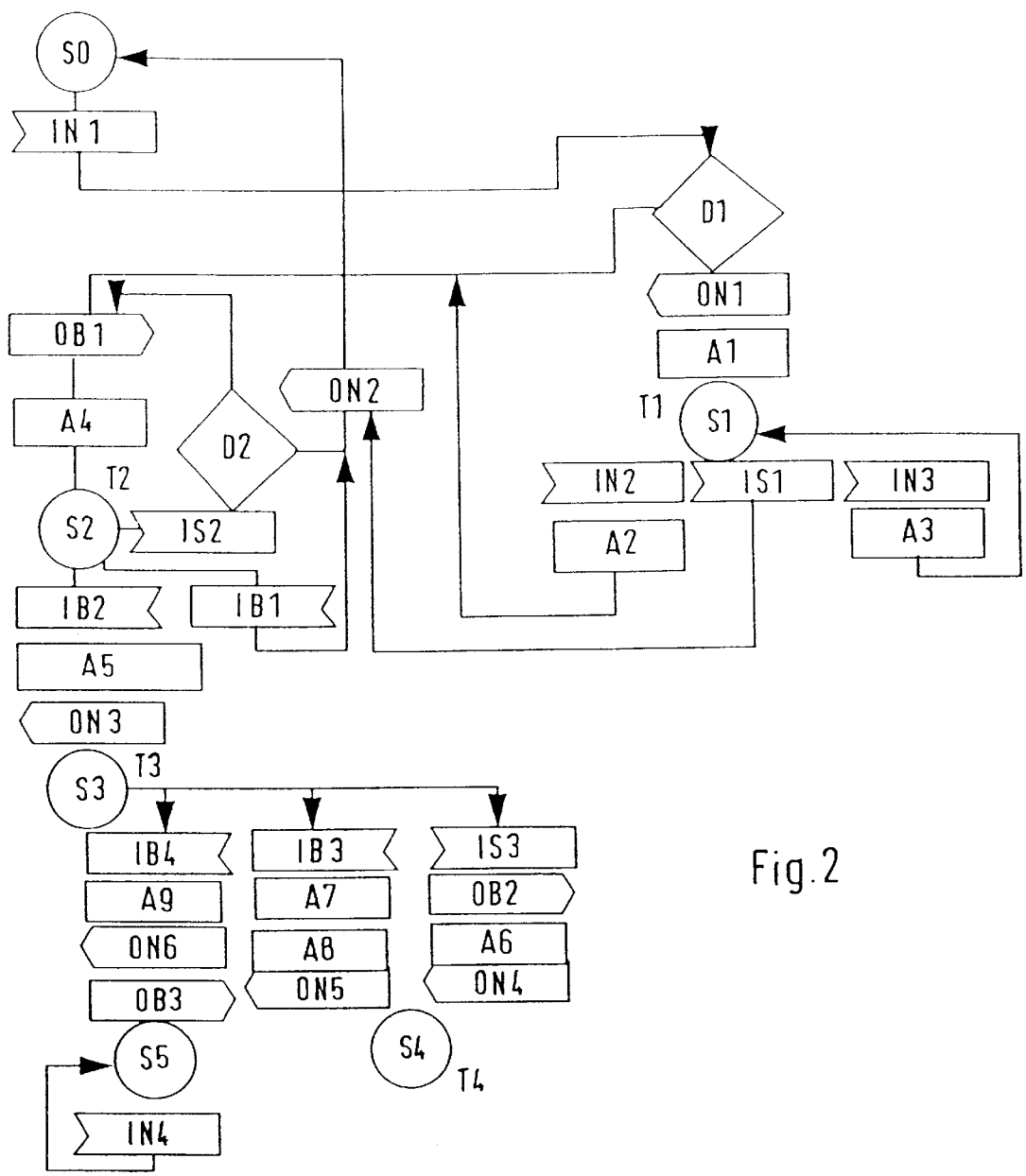
FIG. 2 shows a flow diagram for a method according to the invention, where the connection setup is initiated from the ISDN side.

Referring now to FIG. 2, there is first described a connection setup initiated from the ISDN side. A connection setup request IN1 received in the idle state S0 is first transmitted to a decision D1. If this message IN1 includes all necessary information, then a message OB1 (setup) with identical contents is transmitted to the ATM side. If some information is still missing, then the missing information is requested by a message ON1 (setup ack); subsequently, a timing circuit T1 (timeout after approximately 10 to 15 seconds) is started by the action A1 and a wait state S1 (overlap receiving) is assumed. If the missing information is completed through a message IN2 (info. complete), then the timing circuit T1 is stopped by an action A2 and the message OB1 is transmitted. If another message IN3 is received, then the timing circuit is restarted through an action A3, and the wait state S2 is subsequently assumed. If the timing circuit has timed out without a result as indicated by a system message IS1, then a message ON2 (release complete) is returned which releases the narrowband side. Subsequently, the idle state S0 is assumed again.

If the message OB1 (setup) was transmitted to the broadband side, then another timing circuit T2 (timeout after approximately 4 seconds) is started by an action A4, and another wait state S2 (call initiated) is assumed.

If a system message IS2 indicates that the timing circuit T2 has timed out, then it is checked by a decision D2 if this is the first timeout of the timing circuit or already the second timeout. If it is the first timeout of the timing circuit, then a new attempt is started by sending a new message OB1 (setup). During the second timeout of the timing circuit, a message ON2 (release complete) is returned and the idle state So is assumed again. The same result is obtained when a message IB1 (release complete) is returned from the broadband side indicating that the connection has not been established.

If successful, the wait state S2 is terminated by a message IB2 (call proceeding). The timing circuit T2 is stopped by an action A5, and another timing circuit T3 (timeout after approximately 10 seconds) is started. After returning a message ON3 (call proceeding), another wait state S3 (outgoing call) is assumed.

If the timing circuit T3 times out, this state is terminated by a system message IS3 and a message OB2 (release) is sent the broadband side. A new timing circuit T4 (timeout after approximately 30 seconds) is started in an action A6, a message ON4 released is returned, and a wait state S4 (release indication) is assumed.

If a message IB3 (release) is received from the broadband side with the message indicating that the connection has not been established, then the timing circuit T3 is stopped by an action A7, the timing circuit T4 is started by an action A8, a message ON5 (release) is returned and the wait state S4 (release indication) is assumed.

If a message IB4 (connect) is received from the broadband side indicating that a connection has been established, then the timing circuit T3 is stopped by an action A9, a message ON6 (connect) is transmitted indicating that a connection has been established, the message IB4 is confirmed by a message OB3 (connect acknowledge) and an active connection state S5 is assumed. A subsequent confirming message IN4 (connect acknowledge) is received from the narrowband side.

A connection setup originating from the ATM side is now described with reference to FIG. 3. A connection setup request IB5 (setup request) received in the idle state S0 is routed onward to the ISDN side as message ON7 (setup request). A timing circuit T6 (timeout after approximately 4 seconds) is started by the action A10 and a transition into a wait state S6 (call present) is made.

The wait state S6 can be terminated by a number of different events: the ISDN side rejects the connection by sending a message IN5 (release complete); the ISDN side sends a message IN6 (call proceed) indicating a delay; the ISDN side confirms the connection setup request through a message IN7 (setup acknowledge); the ISDN side does not respond within a predetermined time period and a message IS4 is sent by the timing circuit T6; the ISDN side accepts the connection through a message IN8 (connect).

In the event of a rejection through the message IN5, the timing circuit T6 is stopped by an action A11 and the non-acceptance is returned to the ATM side as message OB4. Then the idle state S0 is assumed again.

If a delay is reported by the message IN6, then the timing circuit T6 is stopped by an action A12, another timing circuit T7 (timeout after approximately 10 seconds) is started by an action A13, the contents of the message IN6 is transmitted to the ATM side by a message OB5 and a state S7 (incoming call proceeding) is assumed.

If the ISDN side accepts the connection through the message IN8, then the timing circuit T6 is stopped by an action A14, the acceptance is transmitted to the ATM side through a message OB6 (connect), another timing circuit T8 (timeout after approximately 4 seconds) is started by an action A15 and a wait state S8 (incoming) is assumed.

If the ISDN side confirms the connection setup request through the message IN7 (setup acknowledge), then the timing circuit T6 is stopped by an action A16, a timing circuit T9 (timeout after approximately 20 seconds) is started by an action A17, and a transition is made to a state S9 (overlap sending).

If the ISDN side does not respond at all to the connection setup request, message ON7, then it is checked by a decision D3 in response to the system message IS4 if this is the first occurrence out or not. After the first timeout, a second message ON7 (setup) is sent, after the second timeout a message OB7 (release complete) is returned to the requesting ATM side, the connection setup attempt is canceled and the idle state S0 is assumed again.

The state S9 can be exited in four different ways: the ISDN side reports a delay through a message IN9 (call proceeding); the system reports by way of a message IS5 that information is available for setting up a connection which has to be sent to the ISDN side by way of a message ON8; the system reports through a message IS6 that the timing circuit T9 has timed out; or the ISDN side accepts the connection through a message IN10 (connect).

In the event of a message IN9 indicating a delay, the timing circuit T9 is stopped through an action A18, the timing circuit T7 is started through an action A19, the ATM side is informed through a message OB8 (call proceeding) and the state S7 is assumed.

After another message ON8 is sent, the timing circuit T9 is restarted by an action A20 and the state S9 is maintained.

If the timing circuit T9 has timed out without a result, then the connection to the ISDN side is terminated through a message ON9 (disconnect); the timing circuit T4 is started through the action A21, and the state S4 (release indication) is assumed.

If the ISDN side accepts the connection from the state S9 through the message IN10, then the timing circuit T9 is stopped by an action A22, the ATM side is informed thereof through a message OB9 (connect), the timing circuit T8 is started through an action A23 and a state S8 (incoming) is assumed.

If the ISDN side assumes the wait state S7 as a result of a message indicating a delay, then again four possibilities can occur: the ISDN side accepts the connection through a message IN11 (connect); the ISDN side indicates through a message IN12 (alert) that the called terminal has been informed of the connection request but has not yet sent a confirmation; the ISDN side reports through a message IN13 (progress) that additional time is required for processing; or the system reports through a message IS7 that the timing circuit T7 has timed out.

If the connection is accepted through the message IN11 (connect), then the timing circuit T7 is stopped through an action A24, the ATM side is informed thereof through a message OB10 (connect), the timing circuit T8 is started through an action A25, and the state S8 is assumed.

In case of a message IN12 (alert), the timing circuit T7 is stopped through an action A26 and the state S7 is assumed again.

Also in the event of a message IN13 (progress), the timing circuit T7 is stopped through an action A27, and the state S7 is assumed again.

If the system reports through a message IS7 that the timing circuit T7 has timed out, then the connection to the ISDN side is terminated through a message ON10 (disconnect), the timing circuit T4 is started through an action A28 and the state S4 is assumed.

The state S8 was reached after a message was received by the ATM side that the ISDN side accepts the connection (connect). While in the state S8, there is a wait until confirmation from the ATM side is received. If confirmation is received through a message IB6, then the timing circuit T8 is stopped through an action A29, the confirmation is routed onward through a message ON11 (connect acknowledge), and the state S5 is assumed. If no confirmation is received from the ATM side, then the system reports through a message IS8 when the timing circuit T8 has timed out. Subsequently, messages are sent to both sides, OB11 (release) and ON12 (disconnect), indicating that no confirmation was received. After the timing circuit T4 is started through an action A30, the state S4 is assumed.

Finally, the process of disconnecting a connection setup will be described with reference to FIG. 4:

If a message IB7 (released) is received on the ATM side with a request to disconnect the connection, then the timing circuit T4 is started through an action A31, this request is transmitted to the ISDN side through a message ON13 and the state S4 is assumed. If the disconnect of the connection is reported by the ISDN side through a message IN14 (release complete), then this is transmitted to the ATM side through a message OB 12 (release), a timing circuit T10 (timeout after approximately 30 seconds) is started through an action A32 and a waiting state S10 is assumed.

If no message IN14 (release complete) is received after the timing circuit T4 has timed out, then the timing circuit T4 releases a message IS9 which has the same effect as the message IN14.

If a confirmation message IB8 (release complete) is returned from the ATM side in response to the message OB12 (release), then the timing circuit T10 is stopped through an action A33, and the idle state S0 is assumed again. If no confirmation IB8 is received before the timing circuit T10 times out, then at the first occurrence, the message OB12 is repeated to the ATM side through a system message IS10 and a decision D4, and at the second occurrence, the idle state S0 is also assumed.

If it is reported by the ISDN side, either through a message IN15 (disconnect) or, depending of the respective cause, through a message IN16 (release), that the connection has been disconnected, then this fact is transmitted initially to the ATM side in a message OB13 (release), a timing circuit T11 (timeout after approximately 30 seconds) is started through an action A34, and a state S11 (release request) is subsequently assumed.

In the state S11, there is expected a confirmation message IB9 (release) or IB10 (release complete). If one of these messages is received, then the timing circuit T11 is stopped through an action A35, a message ON14 (release complete) is transmitted to the ISDN side, and the idle state S0 is assumed. If no message IB9 or IB10 is received before the timing circuit T11 times out, then at the first occurrence, the message OB13 is repeated to the ATM side through a system message IS11 and at the second occurrence, a message ON14 is initially again sent, whereafter the idle state S0 is assumed.

If the interface device IWF is integrated into one of the two neighboring exchanges ISDN or ATM, then it may be possible to eliminate the respective signaling channel CH16 or VPCS. This task is then assumed by other connections internal to the exchange.

Although the invention has been shown and described with respect to a best mode embodiment thereof, it should be understood by those skilled in the art that the foregoing and various other changes, omissions and additions in the form and detail thereof may be made therein without departing from the spirit and scope of the invention.

What is claimed is:

1. A method of operating an interface device comprising the steps of:

receiving telecommunications signals in an interface device for connecting with a plurality of connections, from either a first telecommunications subnetwork (ISDN) operating in a synchronous time-division multiplex mode (ISDN) with a fixed assignment of time slots with transmission channels using a first signaling protocol (SI1) or from a second telecommunications subnetwork (ATM) operating in a statistical multiplex mode (ATM) with transmission capacity assigned to each connection using a second signaling protocol (SA1), performing a conversion between the first signaling protocol and the second signaling protocol in the interface device, wherein during each connection setup the signaling is converted by adapting a number of transmission channels reserved in the first subnetwork (ISDN) for the connection undergoing set up to a transmission capacity assigned to said connection in the second subnetwork (ATM) so that only a capacity required by said capacity reserved in the first subnetwork is occupied in said second subnetwork, and further comprising the steps of converting user information based on a pattern fixed during the connection undergoing setup by signalling (SI1, SA1), for transmitting a respective data stream in an original form thereof.

2. An interface device (IWF) for connecting a first telecommunications subnetwork (ISDN), operated in a synchronous time-division multiplex mode (ISDN) with a fixed assignment of time slots to transmission channels using a first signaling protocol (SI1), to a second telecommunications subnetwork (ATM), operated in a statistical multiplex mode (ATM) with a transmission capacity assigned to each connection by using a second signaling protocol (SA1), the interface device comprising:

means for performing a conversion between the first signaling protocol and the second signaling protocol, wherein during each connection (C1, C2) setup, the signaling is converted in such a way that a number of transmission channels is reserved in the first subnetwork (ISDN) for the connection to be set up and the transmission capacity assigned to said connection in the second subnetwork (ATM) are adapted to one another so that only the transmission capacity required by said reserved capacity and said assigned capacity is occupied in said respective first network and said second network; and means (DI1, DA1, DI2, DA2) for converting a data stream corresponding to each connection between a data format relating to said first subnetwork to a data format relating to said second subnetwork.

3. An exchange (ISDN, ATM) including an interface device (IWF) for connecting a first telecommunications subnetwork (ISDN), operated in a synchronous time-division multiplex mode (ISDN) with a fixed assignment of time slots to transmission channels using a first signaling protocol (SI1), to a second telecommunications subnetwork (ATM), operated in a statistical multiplex mode (ATM) with a transmission capacity assigned to each connection by using a second signaling protocol (SA1), the interface device including means for performing a conversion between the first signaling protocol and the second signaling protocol, wherein during each connection setup, the signaling is converted in such a way that a number of transmission channels reserved in the first subnetwork (ISDN) for the connection to be set up and the transmission capacity assigned to said connection in the second subnetwork (ATM) are adapted to one another so that only a respective required transmission capacity is occupied in both said first subnetwork and said second subnetwork.

4. Interface Device (IWF), for interfacing between a synchronous time-division multiplex access (ISDN) subnetwork and a statistical multiplex (ATM) subnetwork, comprising:

a controller (SC) for connection by an ISDN signaling channel of a primary access connection to the ISDN subnetwork and by an ATM signaling channel of a user network interface (UNI) to the ATM subnetwork wherein the primary access connection has a fixed transmission capacity; and one or more devices (DI1, DA1; DI2, DA2) for connection to the ISDN subnetwork by one or more corresponding information links (C1, C2) comprising basic transmission channels (Ch1, . . . , Ch6; Ch20, . . . , Ch30) of said primary access connection wherein each information link has a required transmission capacity for connection to the ATM subnetwork by one or more corresponding information channels (VPC12, VPC13) of said UNI for converting information exchanged between the ISDN subnetwork in fixedly assigned time slots and the ATM subnetwork in the information channels under the control of the controller (SC)

wherein the information channels occupy capacities corresponding to respective required transmission capacities of the information links such that only the respective required capacities are occupied in both the ATM subnetwork and the ISDN subnetwork.

5. An exchange (ISDN, ATM) including an interface device (IWF) for connecting a first telecommunications subnetwork (ISDN), operated in a synchronous time-division multiplex mode (ISDN) with a fixed assignment of time slots to transmission channels using a first signalling protocol, to a second telecommunications subnetwork (ATM), operated in a statistical multiplex mode (ATM) with a transmission capacity assigned to each connection using a second signalling protocol, the interface including:

a controller (SC) for connection by an ISDN signalling channel of a primary access connection to the first telecommunications subnetwork and by an ATM signalling channel to the second telecommunications subnetwork wherein the primary access connection has a fixed transmission capacity; and one or more devices (DI1, DA1; DI2, DA2) for connection to the first telecommunications subnetwork (ISDN) by one or more corresponding information links (C1, C2) comprising basic transmission channels of said primary access connection wherein each information link has a required transmission capacity for connection to the second telecommunications subnetwork (ATM) by one or more corresponding information channels (VPC12, VPC13), said devices under the control of the controller (SC) for converting information exchanged between the first telecommunications subnetwork in fixedly assigned time slots and the second telecommunications subnetwork in the information channels wherein the information channels occupy capacities corresponding to respective required transmission capacities of the information links such that only the respective required capacities are occupied in both the first telecommunications subnetwork and the second telecommunications subnetwork.

* * * * *